LUTZ, EBERLY & BECKER.
Thrashing Machine.
No. 87,949.                                           Patented March 16, 1869.
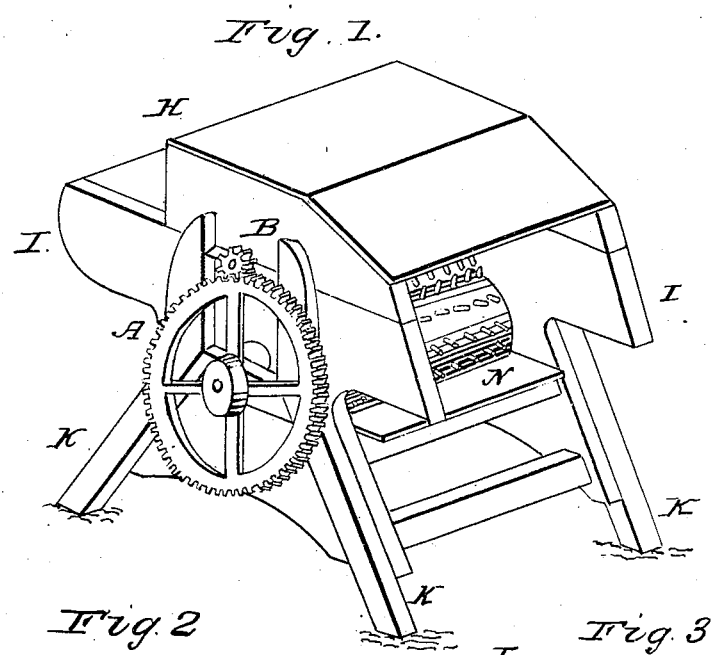
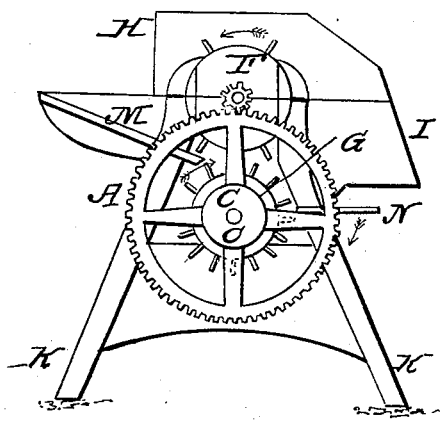
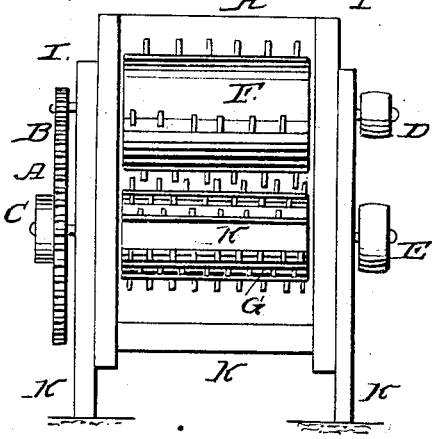
Witnesses
A. H. Carpenter
Cyrus Ream
Inventors
Jacob Lutz
John A. Eberly
Henry Becker

JACOB LUTZ, JOHN A. EBERLY, AND HENRY BECKER, OF EAST COCALICO TOWNSHIP, PENNSYLVANIA.

Letters Patent No. 87,949, dated March 16, 1869.

IMPROVEMENT IN THRESHING-MACHINES.

The Schedule referred to in these Letters Patent and making part of the same.

*To all whom it may concern:*

Be it known that we, JACOB LUTZ, JOHN A. EBERLY, and HENRY BECKER, of East Cocalico township, in the county of Lancaster, and State of Pennsylvania, have invented a new and useful Improvement on the old-fashioned Threshing-Machines; and we do hereby declare that the following is a full, clear, and exact description of the construction and operation of the same, reference being had to the accompanying drawings, making a part of this specification, in which—

Figure 1 is a perspective view of the machine, with our improvements in place.

Figure 2, a side elevation, or plan view.

Figure 3, the same, as seen from the rear.

The nature of our invention consists in the manner of arranging the gear, in reference to the use of two spiked cylinders, so as to produce the most happy results on a small and compact machine, without the use of concaves.

To enable others skilled in the art to make and use our invention, it is only necessary to say that we use two cylinders, one over the other, F G, the upper, F, being somewhat larger, or greater in diameter than the lower one, G, and has six rows of spikes, or beaters. The lower cylinder G has fifteen rows of spikes, but on the shaft of the upper, there is a pinion, B, of, say, seven cogs, on the one end, and a strap-pulley, D, on the other end of this shaft.

The lower cylinder, G, shaft has a large spur, or cogged wheel, A, with about forty-two cogs, and a strap-pulley, C, on the one side, and also a strap, or belt, or connecting-pulley, E, on the opposite end of the shaft.

The arrangement of this gear and cylinders is clearly shown, as also the sides I, top, or cap H, and frame-supports K K, and the feed-board, or inclined plane M, and discharge-table, or plate N.

The operation is such, that by the less rows of spikes and increased speed of the upper, and larger cylinder, making six revolutions to the one of the lower, this lower being provided with fifteen rows of spikes, so placed, that while they come closely to each other, they do not interfere with each other, the upper and lower cylinders jointly drawing the straw and grain inward, and work it out over the discharge-table N, in a rapid manner, while every grain is thoroughly beaten out, by means of less power than when but one cylinder is used, combined with the ordinary concaves, or when a large spur-wheel is employed on the side to mesh into pinions on each shaft of the cylinder, of uniform size and rows of spikes, such, for instance, as that of E. D. Street, rejected 1861, and other attempts heretofore made to utilize two cylinders.

A fair trial, by competent judges, assures us that the arrangement of the gearing and cylinders, as herein presented, results in producing such a machine that will meet the approbation of farmers generally as a compact, efficient, and desirable machine, requiring but little power.

We are aware, that separately considered, there is no novelty in any of its parts, but collectively, as a whole, it is both novel and truly useful. Therefore,

What we claim as our invention, is—

The construction and arrangement of a threshing-machine, when made with cylinders F G, the one with its pinion B, and the other with its spur-wheel A, in combination with the pulleys C D E, all arranged and operating in the manner and for the purpose specified.

JACOB LUTZ.
JOHN A. EBERLY.
HENRY BECKER.

Witnesses:
A. D. CARPENTER,
CYRUS REAM.